(12) United States Patent
Kim et al.

(10) Patent No.: US 12,524,858 B2
(45) Date of Patent: Jan. 13, 2026

(54) IMAGE PROCESSING DEVICE AND IMAGE PROCESSING METHOD THEREOF

(71) Applicant: SAMSUNG ELECTRONICS CO., LTD., Suwon-si (KR)

(72) Inventors: Seungwan Kim, Suwon-si (KR);
Deoksoo Park, Suwon-si (KR);
Byoung-Ju Song, Suwon-si (KR);
Sanghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 18/587,252

(22) Filed: Feb. 26, 2024

(65) Prior Publication Data

US 2024/0354915 A1    Oct. 24, 2024

(30) Foreign Application Priority Data

Apr. 21, 2023 (KR) .................. 10-2023-0052928

(51) Int. Cl.
  *G06T 5/92*  (2024.01)
  *G06T 5/40*  (2006.01)
  *G06T 5/50*  (2006.01)

(52) U.S. Cl.
  CPC ............ *G06T 5/92* (2024.01); *G06T 5/40* (2013.01); *G06T 5/50* (2013.01); *G06T 2207/20021* (2013.01)

(58) Field of Classification Search
  CPC .... G06T 5/92; G06T 5/40; G06T 5/50; G06T 2207/20021; G06T 5/90; G06T 3/4015; G06T 2207/20208; H04N 5/57
  See application file for complete search history.

(56) References Cited

U.S. PATENT DOCUMENTS 8,363,131 B2   1/2013  Lin
8,913,194 B2  12/2014  Kim et al.
(Continued)

FOREIGN PATENT DOCUMENTS

JP    2009-17306 A    1/2009
JP     2021-93608 A    6/2021
KR  10-2016-0007325 A  1/2016

OTHER PUBLICATIONS

Ali M. Reza, "Realization of the Contrast Limited Adaptive Histogram Equalization (CLAHE) for Real-Time Image Enhancement", Journal of VLSI Signal Processing 38, 2004, pp. 35-44.
(Continued)

*Primary Examiner* — Grace Q Li
(74) *Attorney, Agent, or Firm* — Sughrue Mion, PLLC

(57) ABSTRACT

An image processing device is provided. The device includes: a processor configured to: perform first tone mapping on an input image frame using a brightness enhancement tone curve corresponding to a current ambient illuminance value to obtain a first result; obtain histogram tone curves by applying a variable contrast limit to a plurality of histograms respectively corresponding to a plurality of sub-images, constituting a previous image frame; perform second tone mapping on the input image frame by interpolating the histogram tone curves to obtain a second result; and provide output image data by performing third tone mapping on the input image frame based on the first result and the second result. The brightness enhancement tone curve corresponds to a first human vision system (HVS) response to a reference ambient illuminance value and a second HVS response to a target ambient illuminance value.

20 Claims, 15 Drawing Sheets

(56) References Cited

U.S. PATENT DOCUMENTS

| | | |
|---|---|---|
| 9,369,684 B2 | 6/2016 | Lim et al. |
| 9,904,991 B2 | 2/2018 | Hirayama |
| 9,922,616 B2 | 3/2018 | Yang et al. |
| 10,140,953 B2 | 11/2018 | Wanat et al. |
| 10,504,487 B2 | 12/2019 | Jung et al. |
| 10,943,336 B2 | 3/2021 | Wu et al. |
| 11,107,204 B2 | 8/2021 | Unger et al. |
| 2008/0089604 A1 | 4/2008 | Kim et al. |
| 2020/0013151 A1* | 1/2020 | Atkins .................... G06T 5/92 |
| 2021/0042893 A1* | 2/2021 | Yelton ................. H04N 13/204 |

OTHER PUBLICATIONS

Jong-Man Kim et al., "Illuminant Adaptive Color Reproduction Based on Lightness Adaptation and Flare for Mobile Phone", 2006 International Conference on Image Processing, pp. 1513-1516.

* cited by examiner

FIG. 4

| Ambient Light Interval | ALATM |
|---|---|
| 0~5000 lux | off |
| 5000~10000 lux | $V_o = ALATM_{5000}(V_i)$ |
| 10000~20000 lux | $V_o = ALATM_{10000}(V_i)$ |
| 20000~40000 lux | $V_o = ALATM_{20000}(V_i)$ |
| Over 40000 lux | $V_o = ALATM_{40000}(V_i)$ |

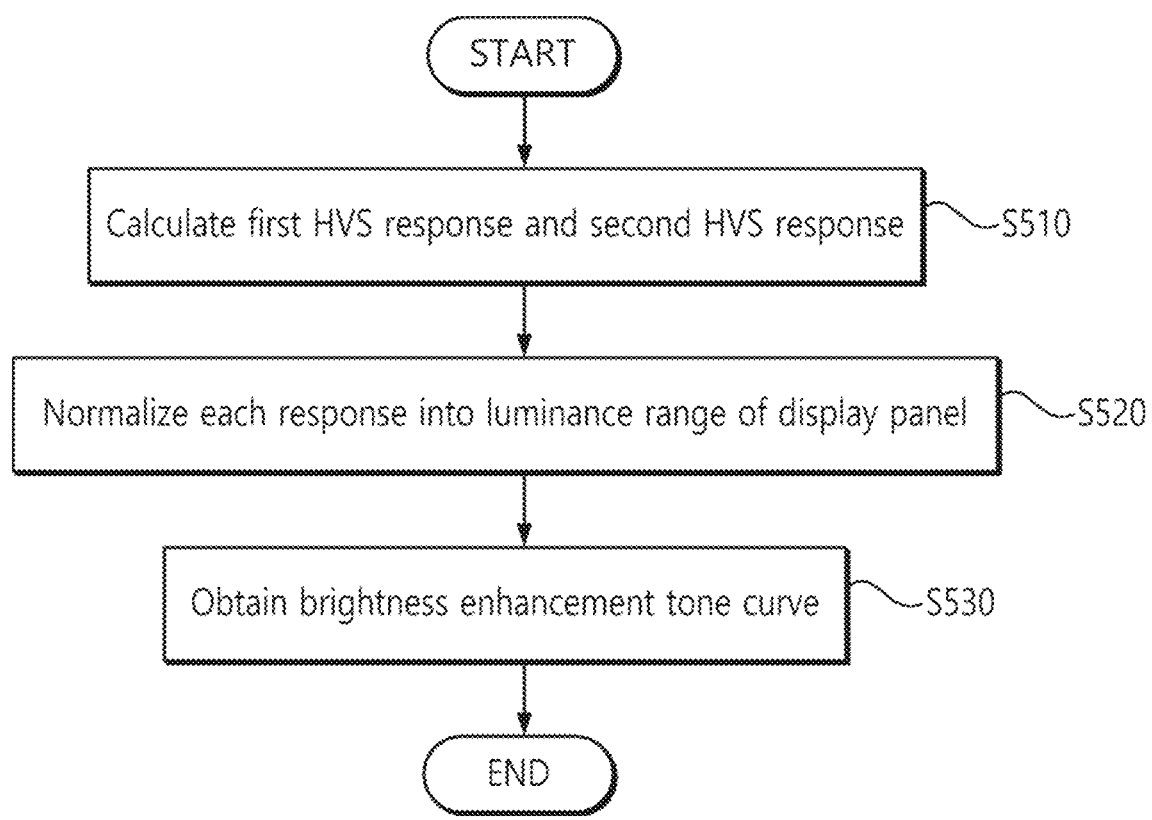

IMAGE PROCESSING DEVICE AND IMAGE PROCESSING METHOD THEREOF

CROSS-REFERENCE TO RELATED APPLICATION

This application claims priority to Korean Patent Application No. 10-2023-0052928, filed on Apr. 21, 2023, in the Korean Intellectual Property Office, the disclosure of which is incorporated herein by reference in its entirety.

BACKGROUND

The present disclosure relates to an image processing device and an image processing method thereof.

Because human eyes are more sensitive to dark light than bright light, a display panel may be implemented such that a difference in brightness between dark pixels of an image is smaller than a difference in brightness between bright pixels of the image.

However, human eyes perceive both light emitted by the display panel and ambient light source reflected from the display panel. In this regard, it may be difficult to perceive details in images displayed with dark brightness in an environment in which intensity of the ambient light source is high.

Accordingly, there is a need for technology, capable of addressing an issue of reduced visibility of images displayed on a panel in environments with high ambient light intensity, such as an outdoor environment.

SUMMARY

One or more example embodiments provide an image processing device, capable of improving visibility of images displayed on a display panel, and an image processing method thereof.

According to an aspect of an example embodiment, image processing device including: a processor configured to: perform first tone mapping on an input image frame using a brightness enhancement tone curve corresponding to a current ambient illuminance value to obtain a first result; obtain histogram tone curves by applying a variable contrast limit to a plurality of histograms respectively corresponding to a plurality of sub-images, constituting a previous image frame; perform second tone mapping on the input image frame by interpolating the histogram tone curves to obtain a second result; and provide output image data by performing third tone mapping on the input image frame based on the first result and the second result. The brightness enhancement tone curve corresponds to a first human vision system (HVS) response to a reference ambient illuminance value and a second HVS response to a target ambient illuminance value.

According to an aspect of an example embodiment, an image processing method includes: performing first tone mapping on an input image frame using a brightness enhancement tone curve corresponding to a current ambient illuminance value to obtain a first result; performing second tone mapping on the input image frame by applying a variable contrast limit to a plurality of histograms respectively corresponding to a plurality of sub-images, constituting a previous image frame, to obtain histogram tone curves; interpolating the histogram tone curves to obtain a second result; and performing third tone mapping on the input image frame based on the first result and the second result. The brightness enhancement tone curve corresponds to a first HVS response to a reference ambient illuminance value and a second HVS response to a target ambient illuminance value.

According to an aspect of an example embodiment, a display device includes: a display panel; an illuminance sensor configured to detect an ambient illuminance value; and an image processing device including a processor configured to: perform first tone mapping on an input image frame using a brightness enhancement tone curve corresponding to a current ambient illuminance value detected by the illuminance sensor to obtain a first result; obtain histogram tone curves by applying a variable contrast limit to a plurality of histograms respectively corresponding to a plurality of sub-images, constituting a previous image frame; perform second tone mapping on the input image frame by interpolating the histogram tone curves to obtain a second result; and provide output image data by performing third tone mapping on the input image frame based on the first result and the second result. The brightness enhancement tone curve corresponds to a first HVS response to a reference ambient illuminance value and a second HVS response to a target ambient illuminance value.

BRIEF DESCRIPTION OF DRAWINGS

The above and other aspects, features, and advantages will be more apparent from the following description of example embodiments, taken in conjunction with the accompanying drawings, in which:

FIG. 4 is a diagram illustrating a plurality of ambient illuminance intervals and a brightness enhancement tone curve corresponding to each of the ambient illuminance intervals, according to an example embodiment.

FIG. 5B is a flowchart illustrating an operation of a brightness enhancement circuit according to an example embodiment.

DETAILED DESCRIPTION

Hereinafter, example embodiments will be described with reference to the accompanying drawings. Example embodiments described herein are provided as examples, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
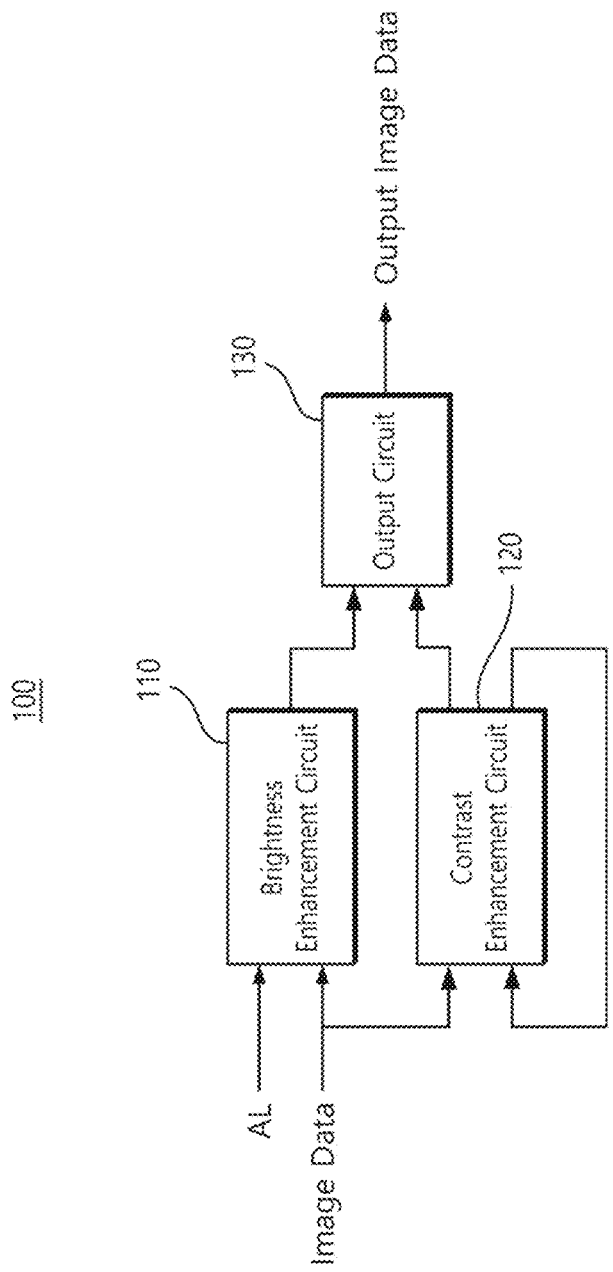
FIG. 1 is a block diagram of an image processing device according to an example embodiment.

FIG. 1 is a block diagram of an image processing device according to an example embodiment. Referring to FIG. 1, an image processing device 100 may include a brightness enhancement circuit 110, a contrast enhancement circuit 120, and an output interface 130.

The brightness enhancement circuit 110 may perform tone mapping to enhance brightness of an image frame input to the image processing device 100. For example, the brightness enhancement circuit 110 may perform tone mapping in consideration of the degree to which a person perceives an image depending on ambient light.

For example, the brightness enhancement circuit 110 may obtain a brightness enhancement tone curve corresponding to an ambient illuminance value AL. When receiving the ambient illuminance value AL and image data of an image frame, the brightness enhancement circuit 110 may perform tone mapping on an input image frame using the obtained brightness enhancement tone curve. The brightness enhancement circuit 110 may perform tone mapping on the entire image frame using a single tone mapping operator (for example, the brightness enhancement tone curve). Accordingly, tone mapping performed by the brightness enhancement circuit 110 may be global tone mapping.

In this case, the brightness enhancement tone curve may be a tone curve determined based on a first human vision system (HVS) response to a reference ambient illuminance value and a second HVS response to a target ambient illuminance value. The HVS response represents the degree of response of a human eye depending on brightness of light. The reference ambient illuminance value may be a predetermined value. For example, the reference ambient illuminance value may be an ambient illuminance value at which visibility of a user is not reduced when brightness of a display panel, on which the input image frame is to be displayed, is maximum, but example embodiments are not limited thereto. The reference ambient illuminance value may be obtained experimentally or by calculation. The target ambient illuminance value may be an illuminance value corresponding to a current ambient illuminance value. In an example embodiment, the target ambient illuminance value may be a current ambient illuminance value. In an example embodiment, the target ambient illuminance value may be a representative illuminance value of an illuminance interval, including a current ambient illuminance value, among a plurality of illuminance intervals.

In the case of generally used global tone mapping based on an exponential function, noise may be increased in a dark area of an image due to over-enhancement. The brightness enhancement circuit 110 according to an example embodiment performs tone mapping based on HVS rather than an exponential function, so that detail in a dark area may be prevented from deteriorating when brightness of an image is enhanced.

The contrast enhancement circuit 120 may perform tone mapping to enhance contrast of an image frame input to the image processing device 100. For example, the contrast enhancement circuit 120 may perform tone mapping using a configuration of an image. For example, the contrast enhancement circuit 120 may perform tone mapping using a histogram of an image.

According to an example embodiment, the contrast enhancement circuit 120 may apply a variable contrast limit to a histogram of each of a plurality of sub-images, constituting a previous image frame of an input image frame, to obtain histogram tone curves. Thus, the contrast enhancement circuit 120 may interpolate the obtained histogram tone curves to perform tone mapping on the input image frame. In this case, tone mapping is performed for each pixel of the input image frame based on a pixel value of the corresponding pixel and a pixel values of neighboring pixels, so that the tone mapping performed by the contrast enhancement circuit 120 may be local tone mapping.

In an environment with high ambient light intensity, such as an outdoor environment, visibility of a dark area of an image is significantly low as compared with visibility of a bright area of the image. Because the contrast enhancement circuit 120 according to an example embodiment uses a variable contrast limit, the contrast limit may be applied such that the contrast is more enhanced in a dark area than in a bright area.

The output interface 130 may perform final tone mapping on the image frame based on a tone mapping result of the brightness enhancement circuit 110 and a tone mapping result of the contrast enhancement circuit 120, and may output output image data generated as a result of the final tone mapping. For example, the output interface 130 may blend or mix the tone mapping result of the brightness enhancement circuit 110 and the tone mapping result of the contrast enhancement circuit 120 to generate a final tone mapping curve. Accordingly, the output interface 130 may tone-map the input image frame using the final tone mapping curve to output the output the image data.

When a degree to which a human eye responds is taken into consideration to improve visibility, contrast of a dark image should be enhanced while increasing brightness of the dark image and contrast of a bright image should be enhanced while maintaining brightness of the bright image. As described above, the image processing device 100 according to an example embodiment may simultaneously achieve enhancement of brightness and enhancement of contrast through operations of the brightness enhancement circuit 110 and the contrast enhancement circuit 120. Accordingly, in the case of a dark image, contrast may be enhanced while increasing brightness, and in the case of a bright image, contrast may be enhanced while maintaining brightness.

For example, in the high ambient light intensity environment such as an outdoor environment, the visibility of the dark area is significantly lower than the visibility of the bright area. In this regard, contrast needs to be more enhanced in the dark area. As described above, the contrast enhancement circuit 120 may apply a contrast limit such that contrast is more enhanced in a dark area of an image than in a bright area of the image, so that visibility of the image may be further improved in the high ambient light intensity environment. In this case, when only the contrast enhancement circuit 120 is present in the image processing device 100, brightness of the bright area of the image may be decreased to be lower than needed, due to the contrast limit. However, the image processing device 100 according to an example embodiment includes the brightness enhancement circuit 110, so that the contrast of the image may be enhanced while maintaining brightness of the bright area. In addition, the brightness enhancement circuit 110 performs tone mapping based on HVS, so that the brightness of the image may be increased without deterioration of details in the dark area.

As described above, an image frame input to the image processing device 100 may be an image frame of a video or an image frame of a still image. Image data of an image frame may include pixel values of pixels constituting the image frame. In this case, each pixel value may include at least one of an RGB value, an HSV value, or a YUV value of a pixel.

Figure 2:
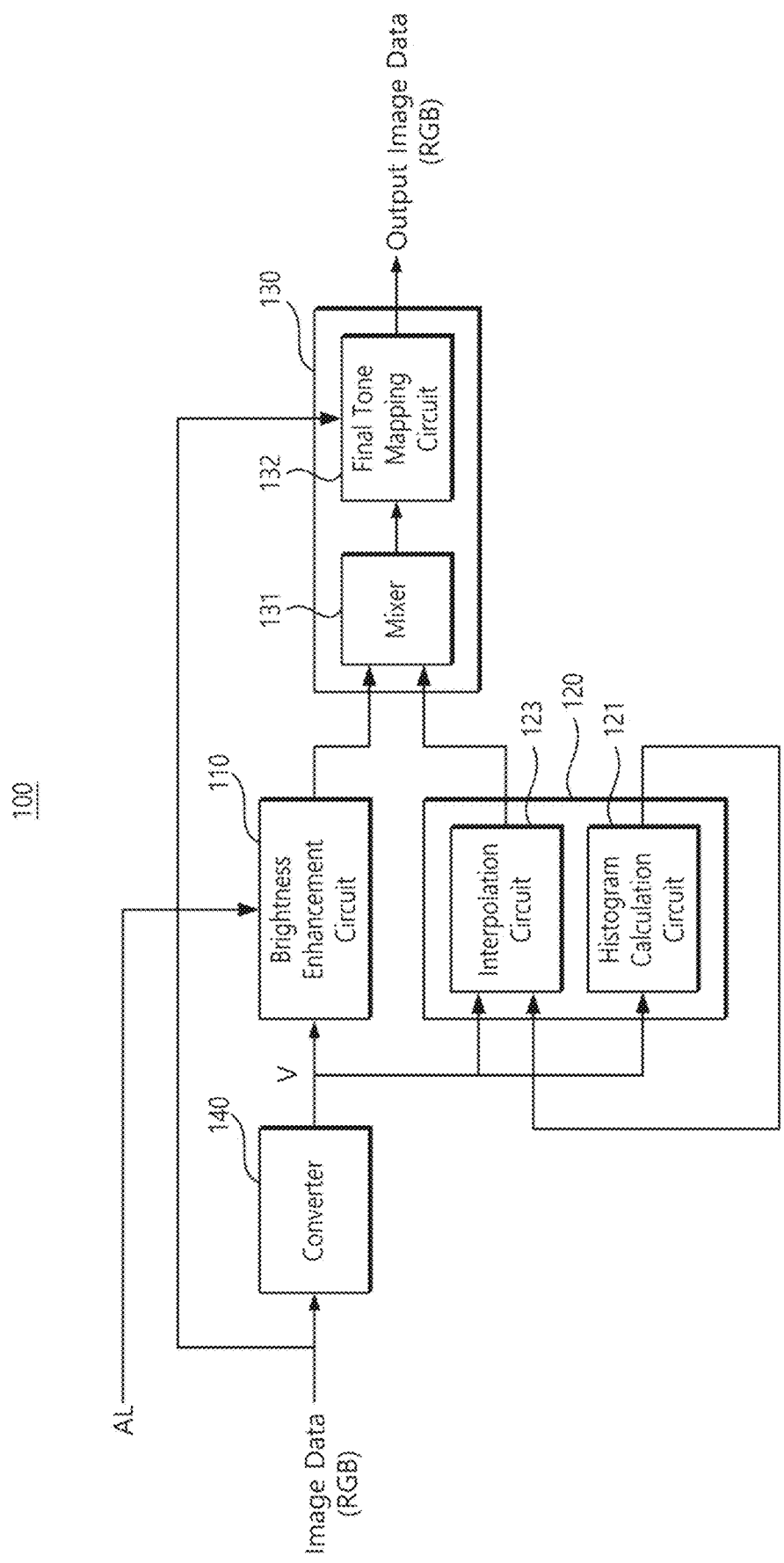
FIG. 2 is a detailed block diagram of an image processing device according to an example embodiment.

FIG. 2 is a detailed block diagram of an image processing device according to an example embodiment. Referring to FIG. 2, the image processing device 100 may include a brightness enhancement circuit 110, a contrast enhancement circuit 120, an output interface 130, and a converter 140.

The converter 140 may convert input image data into color space data, and may provide the color space data to the brightness enhancement circuit 110 and the contrast enhancement circuit 120. According to an example embodiment, when RGB data of an image frame is received, the converter 140 may obtain a V value corresponding to the received RGB data and may provide the obtained V value to the brightness enhancement circuit 110 and the contrast enhancement circuit 120. In this case, the V value refers to a V value of an HSV domain. The V value may be a largest, among a red (R) value, a green (G) value, and a blue (B) value of each pixel of the image frame, but example embodiments are not limited thereto. Thus, an operation of the brightness enhancement circuit 110 or the contrast enhancement circuit 120 and an operation of the mixer 131 of the output interface 130 may be performed in a V domain for an image frame.

The brightness enhancement circuit 110 may perform tone mapping to enhance brightness of an input image frame. For example, the brightness enhancement circuit 110 may perform tone mapping on the input image frame using a brightness enhancement tone curve corresponding to a current ambient illuminance value AL. For example, the current ambient illuminance value AL may be identified using an illuminance sensor.

In this case, the brightness enhancement circuit 110 may internally calculate and obtain a brightness enhancement tone curve corresponding to a current ambient illuminance value. Alternatively, the brightness enhancement circuit 110 may search and obtain a brightness enhancement tone curve corresponding to a current ambient illuminance value, among a plurality of prestored brightness enhancement tone curves. Alternatively, the brightness enhancement circuit 110 may apply a weight corresponding to a current ambient illuminance value to a single prestored brightness enhancement tone curve to obtain a brightness enhancement tone curve corresponding to the current ambient illuminance value, which will be described later in detail.

The contrast enhancement circuit 120 may perform tone mapping to enhance contrast of an input image frame. For example, the contrast enhancement circuit 120 may perform tone mapping using a configuration of an image. To this end, the contrast enhancement circuit 120 may include a histogram calculation circuit 121 and an interpolation circuit 123.

The histogram calculation circuit 121 may perform histogram equalization on each of a plurality of sub-images constituting an image frame.

For example, the histogram calculation circuit 121 may divide an image frame into a plurality of sub-images, and may calculate a histogram for each of the plurality of sub-images. In this case, according to an example embodiment, each of the plurality of sub-images may include a plurality of blocks, and another sub-image and at least one block may overlap with each other. When the plurality of sub-images are divided so as not to overlap each other, discontinuity may appear at a boundary between the sub-images. Accordingly, a portion of the sub-images are divided so as to overlap each other, and thus discontinuity may be prevented from appearing at the boundary of the sub-images.

Also, the histogram calculation circuit 121 may apply a contrast limit to each histogram. In this case, according to an example embodiment, the contrast limit may be set to be variable depending on variably set according to pixel values such that contrast is more enhanced in a dark area of an image frame than in a bright area of the image frame.

Then, the histogram calculation circuit 121 may calculate a cumulative distribution function of the histogram to which the contrast limit is applied, and may normalize the calculated cumulative distribution function to perform histogram equalization on each of the plurality of sub-images. When histogram tone curves for a plurality of sub-images are generated through the histogram equalization, the histogram calculation circuit 121 may provide the generated histogram tone curves to the interpolation circuit 123.

When an image frame is input, the interpolation circuit 123 may obtain histogram tone curves of a plurality of sub-images, constituting a previous image frame of a current input image frame, from the histogram calculation circuit 121. Accordingly, the interpolation circuit 123 may interpolate the obtained histogram tone curves in units of blocks to perform tone mapping on the current input image frame.

For example, the interpolation circuit 123 may interpolate histogram tone curves of sub-images including a corresponding block to generate a final histogram tone curve for each pixel included in the corresponding block. Accordingly, the interpolation circuit 123 may apply pixel values of an area, corresponding to the corresponding block in the current input image frame, to the generated final histogram tone curves to perform tone mapping.

For example, when a first block is commonly included in first to fourth sub-images, the interpolation circuit 123 may interpolate histogram tone curves of the first to fourth sub-images of the previous image frame to generate final histogram tone curves for pixels included in the first block. Accordingly, the interpolation circuit 123 may respectively apply pixel values of the first block area of the current input image frame to the generated final histogram tone curves to perform tone mapping on the first block area of the current input image frame. In such a manner, tone mapping may be performed on the entire current image frame.

As described above, the histogram tone curves of the previous image frame are used in the operation of the contrast enhancement circuit 120. This is because histogram tone curves for the entire image frame are required to perform tone mapping using histogram data. Even when tone mapping is performed on the current image frame using the histogram tone curves of the previous image frame as described above, there is no significant difference in histograms between the previous image frame and the current image frame in most cases, so that it is unproblematic.

The output interface 130 may output output image data based on the tone mapping result of the brightness enhancement circuit 110 and the tone mapping result of the contrast enhancement circuit 120. To this end, according to an example embodiment, the output interface 130 may include a mixer 131 and a final tone mapping circuit 132.

The mixer 131 may mix the tone mapping result of the brightness enhancement circuit 110 and the tone mapping result of the contrast enhancement circuit 120 to generate a final tone mapping curve. For example, the mixer 131 may generate the final tone mapping curve through an operation such as Equation 1 below.

$$TMO = ALATM \cdot \alpha + OSVCLAHE \cdot (1 - \alpha), \quad \text{Equation 1}$$

where TMO (Tone Mapping Operator) represents a final tone mapping operator (for example, a final tone mapping curve), ALATM (Ambient Light Adaptive Tone Mapping) represents a tone mapping result of the brightness enhancement circuit 110, OSVCLAHE (Overlapped Sub-images Variable Contrast Limit Adaptive Histogram Equalization) represents a tone mapping result of the contrast enhancement circuit 120, and a represents a user parameter.

Because the brightness enhancement circuit 110 and the contrast enhancement circuit 120 perform the above-described operations based on the V value of the image frame provided from the converter 140, a final tone mapping curve TMO may also be expressed in the V value domain. The user parameter may be appropriately set, for example by a system designer, to optimize performance of a system including the image processing device 100.

The final tone mapping circuit 132 may output the output image data using the final tone mapping curve generated by the mixer 131. For example, the final tone mapping circuit 132 may apply a final tone mapping curve to RGB data of each input image frame to generate output image data corresponding to each of R, G, and B. Accordingly, the final tone mapping circuit 132 may output the output image data.

For example, the final tone mapping circuit 132 may generate the output image data through an operation such as Equation 2 below.

$$OUT_{RGB} = INPUT_{RGB} \times \frac{TMO(V_{HSV})}{V_{HSV}}, \quad \text{Equation 2}$$

where $OUT_{RGB}$ represents output image data of each of R, G, and B, $INPUT_{RGB}$ represents input image data of each of R, G, and B, $V_{HSV}$ represents a V value of each pixel of input image data, and $TMO(V_{HSV})$ represents a value obtained by applying $V_{HSV}$ to the final tone mapping curve.

An example has been described, where the brightness enhancement circuit 110 and the contrast enhancement circuit 120 operate based on the V value of the HSV domain, but example embodiments are not limited thereto. For example, the brightness enhancement circuit 110 and the contrast enhancement circuit 120 may perform the above-described operations based on the Y value of the YUV domain. In this case, the converter 140 may convert the received RGB data into the YUV domain to provide the Y value to the brightness enhancement circuit 110 and the contrast enhancement circuit 120. According to example embodiments, the brightness enhancement circuit 110 and the contrast enhancement circuit 120 may perform the above-described operations on the RGB data, input to the image processing device 100, for each channel (each of an R channel, a G channel, and a B channel). In this case, the converter 140 may not be required.

Hereinafter, the operation and configuration of the brightness enhancement circuit 110 according to various example embodiments will be described in detail with reference to FIGS. 3A to 6C.

In an example embodiment, the brightness enhancement circuit 110 may calculate brightness enhancement tone curves based on a first HVS response to a reference ambient illuminance value and a second HVS response to a target ambient illuminance value.

For example, when the target ambient illuminance value is received, the brightness enhancement circuit 110 may calculate a first HVS response to a predetermined reference ambient illuminance value and a second HVS response to the received target peripheral illuminance value. In this case, the brightness enhancement circuit 110 may calculate each response using a Naka-Rushton equation, but example embodiments are not limited thereto. The Naka-Rushton equation will be described in detail later.

Figure 3A:
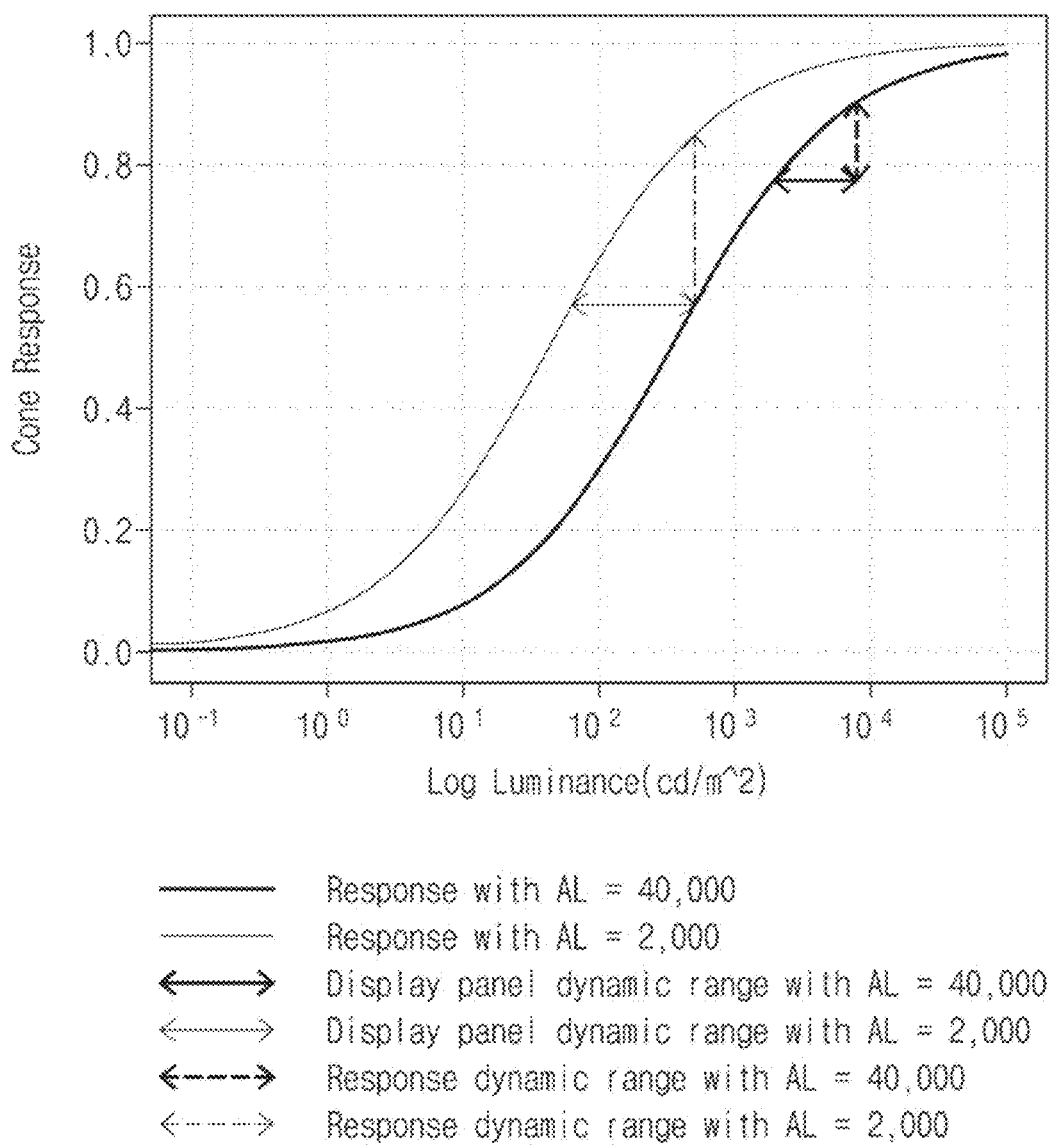
FIG. 3A is a graph illustrating an example of a human vision system (HVS) response based on different ambient illuminance values.

FIG. 3A illustrates HVS responses to a reference ambient illuminance value and a target ambient illuminance value when, for example, the reference ambient illuminance value is 2000[lux] and the target ambient illuminance value is 40000[lux]. From FIG. 3A, it can be seen that a response dynamic range is reduced in a relatively high ambient light intensity environment (AL=40000), resulting in poor visibility.

Figure 3B:
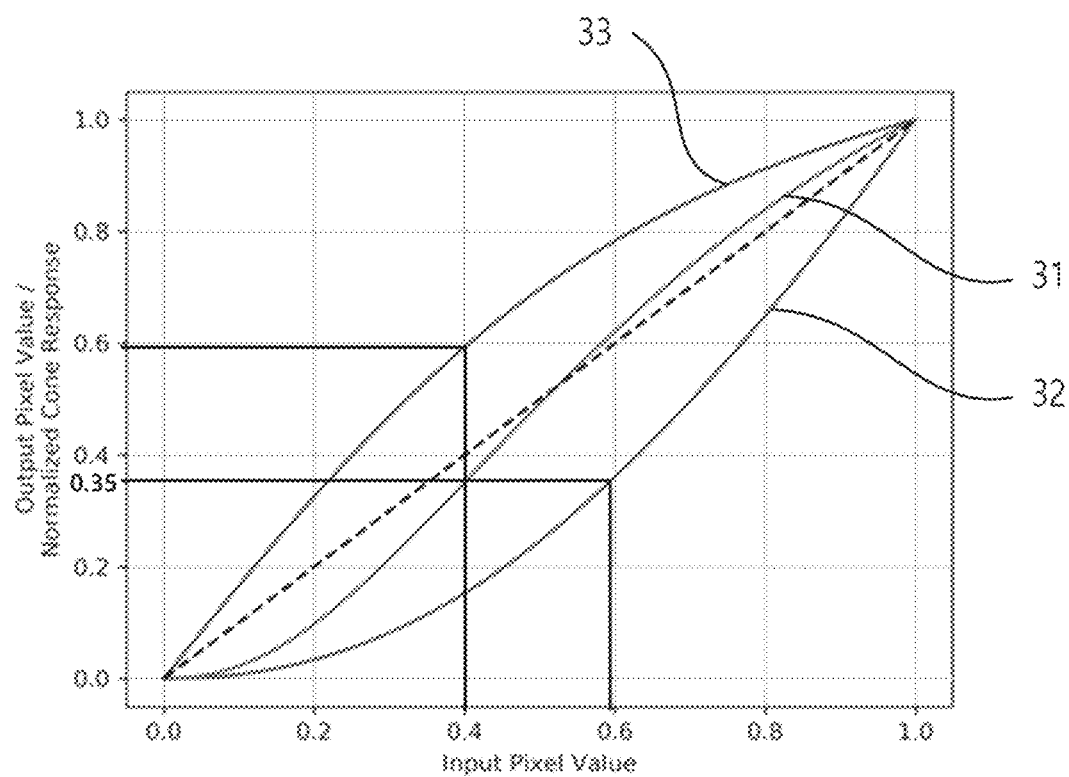
FIG. 3B is a diagram illustrating an operation of a brightness enhancement circuit according to an example embodiment.

The brightness enhancement circuit 110 may normalize the calculated first and second HVS responses to a luminance range of a display panel. FIG. 3B illustrates an example in which the HVS responses of FIG. 3A are normalized to the luminance range of the display panel. For example, reference numeral 31 represents a normalized first HVS response curve and reference numeral 32 represents a normalized second HVS response curve. In this case, the display panel refers to a display panel on which an image processed by the image processing device 100 is displayed, and the luminance range refers to a luminance range in which the display panel may emit light. The display panel dynamic range of FIG. 3A refers to a luminance range of the display panel for each luminance value.

Accordingly, the brightness enhancement circuit 110 may calculate a brightness enhancement tone curve such that a degree, to which a human eye responds in a reference ambient illumination environment, and a degree, to which the human eye responds in a target ambient illumination environment, are similar to each other. For example, the brightness enhancement circuit 110 may define a relationship between an input pixel value of the normalized first HVS response and an input pixel value of the normalized second HVS response, to the same response value, to obtain a bright enhancement tone curve. For example, the brightness enhancement circuit 110 may define a relationship between input pixel values of the normalized first and second HVS responses 31 and 32 to obtain a brightness enhancement tone curve 33 when the normalized first and second HVS responses 31 and 32 have the same response value.

Referring to FIG. 3B, for example, when each of the normalized first and second HVS responses 31 and 32 is 0.35, the input pixel value of the first HVS response may be 0.4 and the input pixel value of the second HVS response may be about 0.59. Because the brightness enhancement tone curve 33 defines the relationship between input pixel values of the normalized first and second HVS responses 31 and 32 to the same response value, it may be identified that an output pixel value based on the brightness enhancement tone curve 33 is about 0.59 when the input pixel value is 0.4.

The brightness enhancement circuit 110 may perform tone mapping using the brightness enhancement tone curve obtained based on the HVS. Accordingly, details of a dark area may be prevented from deteriorating when the brightness of an image is enhanced.

According to an example embodiment, the brightness enhancement circuit 110 may apply a brightness enhancement tone curve based on a representative illuminance value of an illuminance interval to perform tone mapping when a current ambient illuminance value AL is within an illuminance interval, among a plurality of predetermined illuminance intervals.

FIG. 4 is a diagram illustrating a plurality of ambient illuminance intervals according to an example embodiment. Referring to FIG. 4, a plurality of predefined illuminance intervals may include five intervals corresponding to different ambient illuminance values. For example, the plurality of predefined illuminance intervals may include a first range in which the ambient illuminance value is less than 5000 lux, a second range in which the ambient illuminance value ranges from 5000 lux or more to less than 10000 lux, a third range in which the ambient illuminance value ranges from 10000 lux or more to less than 20000 lux, and a fourth range in which the ambient illuminance value ranges 20000 lux or more to less than 40000 lux, and a fifth range in which the ambient illuminance value is 40000 lux or more.

In this case, each illuminance interval may have a representative illuminance value. In an example illustrated in FIG. 4, the representative illumination value of the second interval is 5000 lux, the representative illumination value of the third interval is 10000 lux, the representative illumination value of the fourth interval is 20000 lux, and the representative illumination value of the fifth interval is 40000 lux. On the other hand, FIG. 4 illustrates an example embodiment in which tone mapping is not performed when an ambient illuminance value is within the first interval, so that a representative value is absent in the first interval.

The brightness enhancement circuit 110 may generate a brightness enhancement tone curve for each interval based on the representative illuminance value of each illuminance interval. For example, when the reference ambient illuminance value is set to 2000 lux, the brightness enhancement circuit 110 may generate a brightness enhancement tone curve $ALATM_{5000}$ for the second interval based on a first HVS response to 2000 lux and a second HVS response to 5000 lux, generate a brightness enhancement tone curve $ALATM_{10000}$ for the third interval based on the first HVS response to 2000 lux and the second HVS response to 10000 lux, generate a brightness enhancement tone curve $ALATM_{20000}$ for the fourth period based on the second HVS response to 2000 lux and the first HVS response to 20000 lux, and generate a brightness enhancement tone curve $ALATM_{40000}$ for the fifth interval based on the first HVS response to 2000 lux and the second HVS response to 40000 lux.

Accordingly, referring to FIG. 4, the brightness enhancement circuit 110 may not perform additional tone mapping when a current ambient illuminance value is included in the first interval. Also, the brightness enhancement circuit 110 may tone mapping on an input image frame using a brightness enhancement tone curve for a corresponding illuminance interval when the current ambient illuminance value is included in one of the second to fifth intervals.

Hereinafter, an operation of generating a brightness enhancement tone curve by a brightness enhancement circuit according to an example embodiment will be described in more detail with reference to FIGS. 5A and 5B.

Figure 5A:
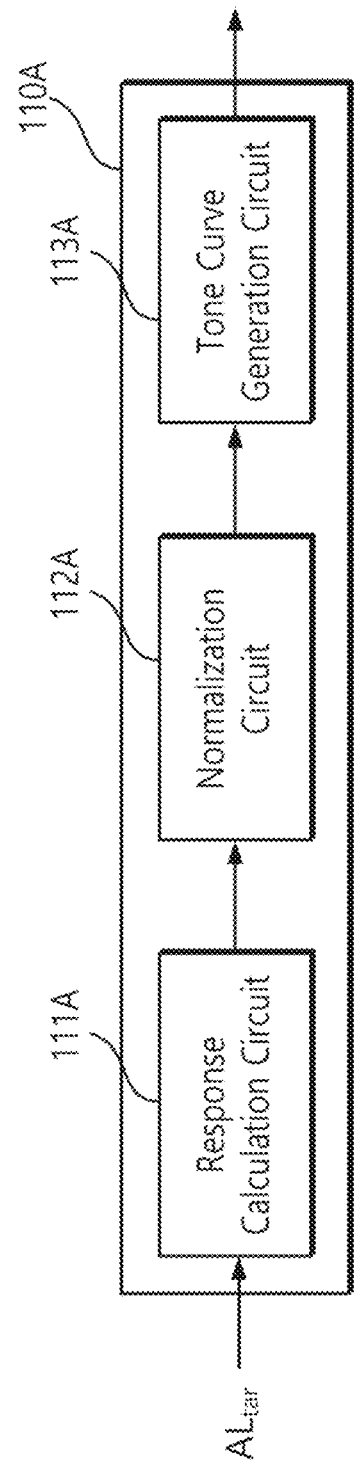
FIG. 5A is a block diagram illustrating a configuration of a brightness enhancement circuit according to an example embodiment.

FIG. 5A is a block diagram illustrating a configuration of a brightness enhancement circuit according to an example embodiment. Referring to FIG. 5A, a brightness enhancement circuit 110A may include a response calculation circuit 111A, a normalization circuit 112A, and a tone curve generation circuit 113A.

When a target ambient illuminance value $AL_{tar}$ is received, the response calculation circuit 111A may calculate a first HVS response to a reference ambient illuminance value and a second HVS response to a target ambient illuminance value, respectively. In this case, the reference ambient illuminance value may be an ambient illuminance value, at which user's visibility is not reduced when the brightness of the display panel is maximum, and may be a preset value. For example, the reference ambient illuminance value may be preset to 2000 [lux] when the maximum brightness of the display panel is 500 [nit], but example embodiments are not limited thereto. According to an example embodiment, the target ambient illuminance value $AL_{tar}$ may be an illuminance value corresponding to the current ambient illuminance value. According to an alternative example embodiment, the target ambient illuminance value $AL_{tar}$ may be a representative illuminance value of each of a plurality of illuminance intervals.

For example, the response calculation circuit 111A may calculate the first HVS response and the second HVS response through an operation such as Equation 3 below.

Equation 3

$$\frac{R}{R_{max}} = \left(\frac{I^n}{I^n + \sigma^n}\right) \quad (3\text{-}1)$$

$$\sigma = I_A^\alpha \times \beta \quad (3\text{-}2)$$

$$I_A = \frac{\text{Reflectance}}{\pi} \times AL \quad (3\text{-}3)$$

$$R_*(L(v_*), AL_*) = \frac{R}{R_{max}} = \left(\frac{L(v_*)^n}{L(v_*)^n + \sigma^n}\right) \quad (3\text{-}4)$$

Equations 3-1 through 3-3 are Naka-Rushton equations, and Equation 3-4 is an equation expressed as an HVS response based on the ambient illuminance value by combining the Naka-Rushton equations. In Equation 3-4, $R_*(L(v_*), AL_*)$ represents a first HVS response to a reference ambient illuminance value (for example, $R_{ref}(L(v_{ref}), AL_{ref})$) or a second HVS response to a target ambient illuminance value (for example, $R_{tar}(L(v_{tar}), AL_{tar})$).

In Equations 3-1 through 3-4, R represents an HVS response, $R_{max}$ represents a maximum value of the HVS response, I represents brightness of a pixel, AL represents an ambient illuminance value, Reflectance represents a reflectance of the display panel, and n, α, and β represent constants according to the Naka-Rushton equations. In this case, the brightness I of the pixel may be expressed as L($v_*$), and $v_*$ represents a pixel value (for example, a value between 0 and 255 in the case of an 8-bit image).

The normalization circuit 112A may normalize the first and second HVS responses calculated by the response calculation circuit 111A to a luminance range of the display panel. For example, the normalization circuit 112A may perform the normalization through an operation such as Equation 4 below.

$$RN_*(L(v_*), AL_*) = \frac{R_*(L(v_*), AL_*) - R_*(L(0), AL_*)}{R_*(L(lev), AL_*) - R_*(L(0), AL_*)}, \quad \text{Equation 4}$$

where $RN_*(L(v_*), AL_*)$ represents a result of normalizing $R_*(L(v_*), AL_*)$, and lev represents a maximum value of an input pixel value (for example, 255 in the case of an 8-bit input image).

The tone curve generation circuit 113A may generate a brightness enhancement tone curve based on the first HVS response and the second HVS response normalized by the normalization circuit 112A. According to an example embodiment, the tone curve generation circuit 113A may define a relationship between $V_{ref}$ and $V_{tar}$, causing the normalized first and second HVS responses to have the same value, to calculate a brightness enhancement tone curve. In this case, $V_{ref}$ represents an input pixel value of the normalized first HVS response, and $V_{tar}$ represents an input pixel value of the normalized second HVS response.

For example, the tone curve generation circuit 113A may generate the brightness enhancement tone curve through an operation such as Equation 5 below.

Equation 5

$$RN_{ref}(L(v_{ref}), AL_{ref}) = RN_{tar}(L(v_{tar}), AL_{tar}) \quad (5\text{-}1)$$

$$v_{tar} = ALATM(v_{ref}), \quad (5\text{-}2)$$

where $RN_{ref}(L(v_{ref}), AL_{ref})$ represents a normalized first HVS response, $RN_{tar}(L(v_{tar}), AL_{tar})$ represents a normalized second HVS response, $V_{ref}$ represents an input pixel value of the normalized first HVS response, $V_{tar}$ represents an input pixel value of the normalized second HVS response, and ALATM represents a brightness enhancement tone curve.

As described above, the brightness enhancement circuit 110A may generate a brightness enhancement tone curve for a target ambient illuminance value $AL_{tar}$. For example, the brightness enhancement circuit 110A may generate a brightness enhancement tone curve for each illuminance interval using a representative luminance value of each illuminance interval of FIG. 4 as a target ambient illuminance value. However, example embodiments are not limited thereto.

The brightness enhancement circuit 110 may perform tone mapping on the image frame using the brightness enhancement tone curve ALATM calculated as described above. For example, the brightness enhancement circuit 110A may perform the tone mapping on an input image frame through an operation such as Equation 6 below.

$$V_o = ALATM(V_i), \quad \text{Equation 6}$$

where $V_i$ represents an input pixel value of an image frame, ALATM represents a brightness enhancement tone mapping operator (for example, a brightness enhancement tone curve), and $V_o$ represents a tone mapping result.

FIG. 5B is a flowchart illustrating an operation of a brightness enhancement circuit according to an example embodiment. Referring to FIG. 5B, in operation S510, the brightness enhancement circuit 110 may calculate a first HVS response to a reference ambient illuminance value and a second HVS response to a target ambient illuminance value. In this case, the brightness enhancement circuit 110 may calculate each HVS response using a Naka-Rushton equation.

In operation S520, the brightness enhancement circuit 110 may normalize the first and second HVS responses to a luminance range of the display panel on which the input image frame is to be displayed.

In operation S530, the brightness enhancement circuit 110 may define a relationship between an input pixel value of the normalized first HVS response and an input pixel value of the second HVS response to the same response value to obtain a brightness enhancement tone curve.

Hereinafter, a configuration and an operation of the brightness enhancement circuit according to various example embodiments will be described with reference to FIGS. 6A and 6B.

Figure 6A:
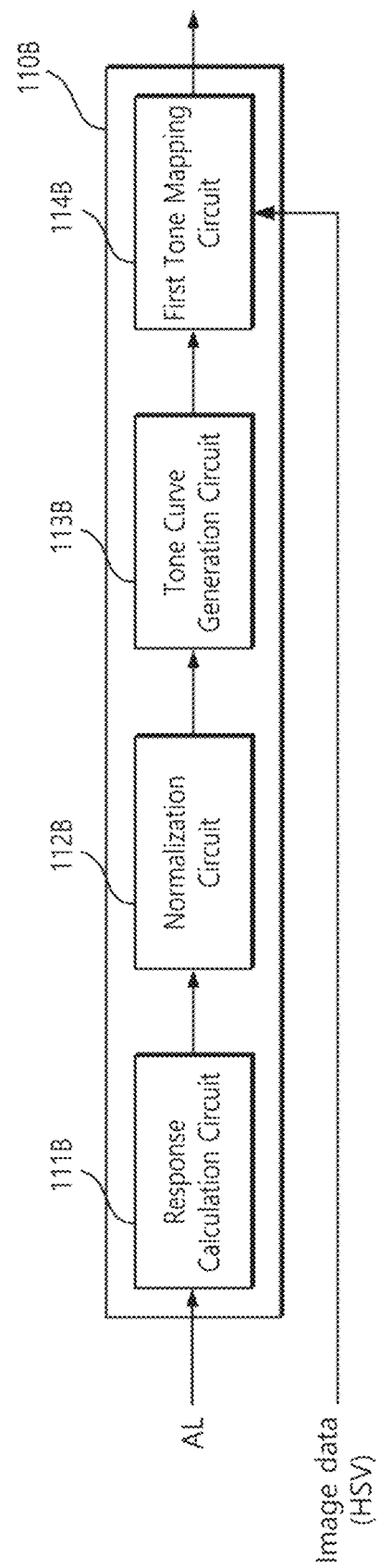
FIG. 6A is a diagram illustrating an implementation example of a brightness enhancement circuit according to an example embodiment.

FIG. 6A is a diagram illustrating an implementation example of a brightness enhancement circuit according to an example embodiment.

Referring to FIG. 6A, a brightness enhancement circuit 110B may include a response calculation circuit 111B, a normalization circuit 112B, a tone curve generation circuit 113B, and a first tone mapping circuit 114B.

When a current ambient illuminance value sensed through an illuminance sensor is received, the response calculation circuit 111B may calculate a first HVS response to a reference ambient illuminance value and a second HVS response to an ambient illuminance value corresponding the current ambient illuminance value. In this case, the ambient illuminance value corresponding to the current ambient illuminance value may be a representative luminance value of an illuminance interval including the current ambient illuminance value, among a plurality of predefined ambient luminance intervals. The ambient illuminance value corresponding to the current ambient illuminance value may correspond to the above-described target ambient illuminance value.

Accordingly, the normalization circuit 112B may normalize the first and second HVS responses, calculated by the response calculation circuit 111B, to a luminance range of a display panel.

The tone curve generation circuit 113B may define a relationship between an input pixel value of a normalized first HVS response and an input pixel value of a normalized second HVS response to the same response value to obtain a brightness enhancement tone curve corresponding to the current ambient illuminance value.

The first tone mapping circuit 114B may perform tone mapping on an image frame using the brightness enhancement tone curve obtained by the tone curve generation circuit 113B. In this case, according to an example embodiment, the first tone mapping circuit 114B may apply a V value of each pixel of the image frame to the brightness enhancement tone curve to perform tone mapping on the image frame, but example embodiments are not limited thereto.

Figure 6B:
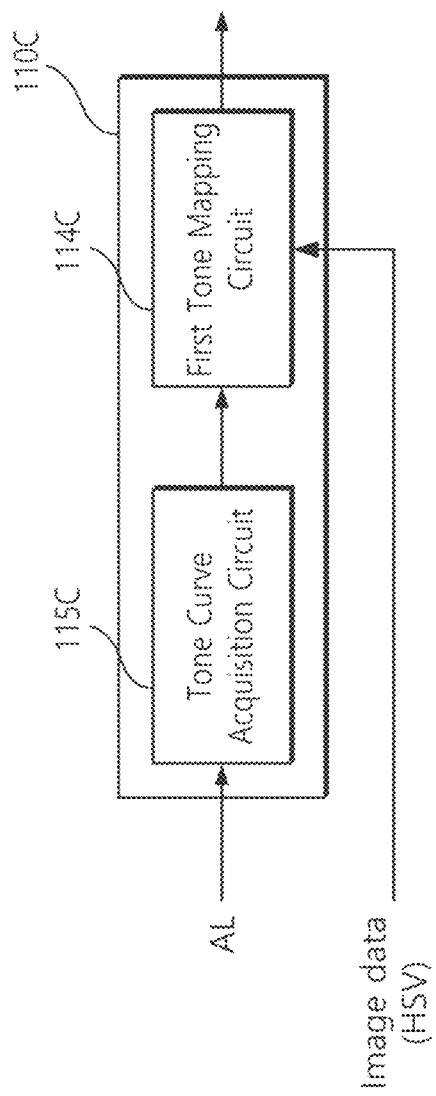
FIG. 6B is a diagram illustrating an implementation example of a brightness enhancement circuit according to an example embodiment.

FIG. 6B is a diagram illustrating an implementation example of a brightness enhancement circuit according to an example embodiment. Referring to FIG. 6B, the brightness enhancement circuit 110C may include a tone curve obtaining circuit 115C and a first tone mapping circuit 114C.

When a current ambient illuminance value is received, the tone curve obtaining circuit 115C may obtain a brightness enhancement tone curve corresponding to an illuminance interval including the current ambient illuminance value, among a plurality of predefined ambient illuminance intervals.

According to an example embodiment, the tone curve obtaining circuit 115C may prestore a plurality of brightness enhancement tone curves, respectively corresponding to the plurality of predefined ambient illuminance intervals. In this case, the plurality of prestored brightness enhancement tone curves may be obtained in advance using a representative illuminance value for a corresponding ambient illuminance interval, as described above with reference to FIG. 4, but example embodiments are not limited thereto. In addition, the plurality of brightness enhancement tone curves may be matched with corresponding ambient illuminance intervals and stored in the form of a look-up table, but example embodiments are not limited thereto. Accordingly, when the current ambient illuminance value is received, the tone curve obtaining circuit 115C may obtain a brightness enhancement tone curve, corresponding to an illuminance interval including the current ambient illuminance value, among a plurality of prestored brightness enhancement tone curves.

According to another example embodiment, the tone curve obtaining circuit 115C may prestore a brightness enhancement tone curve corresponding to a single ambient illuminance interval, among a plurality of ambient illuminance intervals. In this case, the single ambient illuminance interval may be an illuminance interval including a highest luminance value, among the plurality of ambient illuminance intervals, but example embodiments are not limited thereto. In addition, the prestored brightness enhancement tone curve may be obtained in advance using a representative luminance value of a corresponding ambient illuminance interval, but example embodiments are not limited thereto. The tone curve obtaining circuit 115C may store a weight corresponding to each of the plurality of ambient illuminance intervals. Accordingly, when the current ambient illuminance value is received, the tone curve obtaining circuit 115C may apply a weight, assigned to an illuminance interval including the current ambient illuminance value, to a single prestored brightness enhancement tone curve to obtain a brightness enhancement tone curve corresponding to an illuminance interval including the current illuminance value.

The first tone mapping circuit 114C may perform tone mapping on an image frame using the brightness enhancement tone curve obtained by the tone curve obtaining circuit 115C. In this case, according to an example embodiment, the first tone mapping circuit 114C may apply a V value of each pixel of the image frame to the brightness enhancement tone curve to perform tone mapping on the image frame, but example embodiments are not limited thereto.

Hereinafter, a configuration and an operation of the contrast enhancement circuit 120 will be described in detail with reference to FIGS. 7 to 9.

Figure 7:
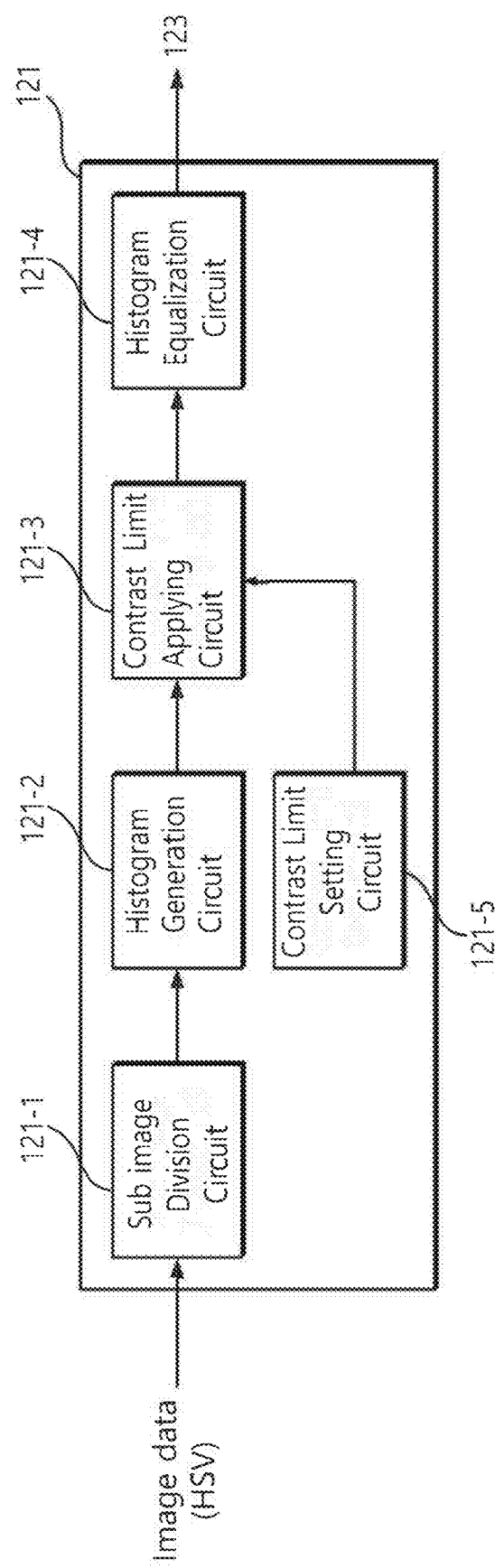
FIG. 7 is a block diagram illustrating a configuration of a histogram calculation circuit according to an example embodiment.

FIG. 7 is a block diagram illustrating a configuration of a histogram calculation circuit according to an example embodiment. Referring to FIG. 7, the histogram calculation circuit 121 may include a sub-image division circuit 121-1, a histogram generation circuit 121-2, a contrast limit applying circuit 121-3, a histogram equalization circuit 121-4, and a contrast limit setting circuit 121-5.

The sub-image division circuit 121-1 may divide an input image frame into a plurality of sub-images. In this case, each of the plurality of sub-images may include a plurality of blocks, and at least one of the plurality of blocks may overlap another adjacent sub-image.

The histogram generation circuit 121-2 may generate a histogram $h_k(k)$ for each of the plurality of sub-images.

The contrast limit setting circuit 121-5 may set a contrast limit to be applied to the histogram generated by the histogram generation circuit 121-2. According to an example embodiment, the contrast limit setting circuit 121-5 may set the contrast limit such that contrast is more enhanced in a dark area of an image than in a bright portion of the image. To this end, the contrast limit setting circuit 121-5 may set a contrast limit such that a contrast limit value for a relatively low pixel value is higher than a contrast limit value for a relatively high pixel value.

For example, the contrast limit setting circuit 121-5 may set the contrast limit through an operation such as Equation 7 below.

$$CL(v_*) = \frac{N}{lev+1} \cdot \left(CL_{min} + \frac{v_*}{lev} \cdot (CL_{max} - CL_{min})\right), \quad \text{Equation 7}$$

where CL represents a contrast limit value, $v_*$ represents a pixel value, N represents a product of a width and an area of an image frame (for example, the total number of pixels in the image frame), and lev represents a maximum value of the pixel value (for example, 255 in the case of an 8-bit input image), $CL_{max}$ represents a maximum contrast limit value, and $CL_{min}$ represents a minimum contrast limit value. In this case, the $CL_{max}$ and $CL_{min}$ may be preset values obtained experimentally or through theoretical calculation by a developer.

It can be seen that the contrast limit, set through Equation 7, has a value variable depending on a pixel value and has, for example, a higher limit value at a relatively low pixel value.

The contrast limit applying circuit 121-3 may apply the contrast limit, set by the contrast limit setting circuit 121-5, to the histogram generated by the histogram generation circuit 121-2. For example, the contrast limit applying circuit 121-3 may limit a histogram value to a contrast limit value when the histogram value is higher than the contrast limit value for the corresponding pixel value, and may maintain the histogram value as it is when the histogram value is less than or equal to the contrast limit value for the corresponding pixel value. Also, the contrast limit applying circuit 121-3 may sum and redistribute all histogram values higher than the contrast limit value.

For example, the contrast limit applying circuit 121-3 may apply the contrast limit to the histogram through an operation such as Equation 8 below.

$$h'_k(k) = \begin{cases} (\text{if } h_k > CL(k)), & CL(k) \\ (\text{if } h_k \leq CL(k)), & h_k \end{cases} \quad \text{Equation 8}$$

$$\text{Error} = \sum_{l=0}^{lev} \max(0, h_l - CL(l))$$

$$h''_k(k) = h'_k + \frac{\text{Error}}{lev+1},$$

where k represents a pixel value, $h_k$ represents a histogram value, CL(k) represents a contrast limit value, $h'_k(k)$ represents a result of applying a contrast limit to the histogram $h_k(k)$, lev represents a maximum value of the pixel value (for example, 255 in the case of an 8-bit input image), Error represents a sum of all histogram values higher than the contrast limit value, and $h''_k(k)$ represents a result of redistributing a value of Error to the histogram.

The histogram equalization circuit 121-4 may calculate a cumulative distribution function for the histogram to which the contrast limit is applied, and may normalize the calculated cumulative distribution function to perform histogram equalization.

For example, the histogram equalization circuit 121-4 may perform the histogram equalization through an operation such as Equation 9 below.

$$CDF(k) = \sum_{i=0}^{k} h''_i \quad \text{Equation 9}$$

$$HE(k) = (lev) \times CDF(k) \times \frac{1}{N},$$

where CDF(k) represents a cumulative distribution function for h", a final result value derived from the contrast limit applying circuit 121-3, N represents a product of a width and an area of an image frame (for example, the total number of pixels in the image frame), lev represents a maximum value of the pixel value (for example, 255 in the case of an 8-bit input image), and HE(k) represents a histogram equalization result for the corresponding sub-image, for example, a histogram tone curve for a corresponding server image.

The above-described histogram equalization process (for example, the operation of the contrast limiting applying circuit 121-3 and the operation of the histogram equalization circuit 121-4) may be performed on each of the plurality of sub-images, and histogram tone curves for the respective sub-images obtained accordingly may be provided to the interpolation circuit 123 to be used for tone mapping on the current image frame.

Figure 8:
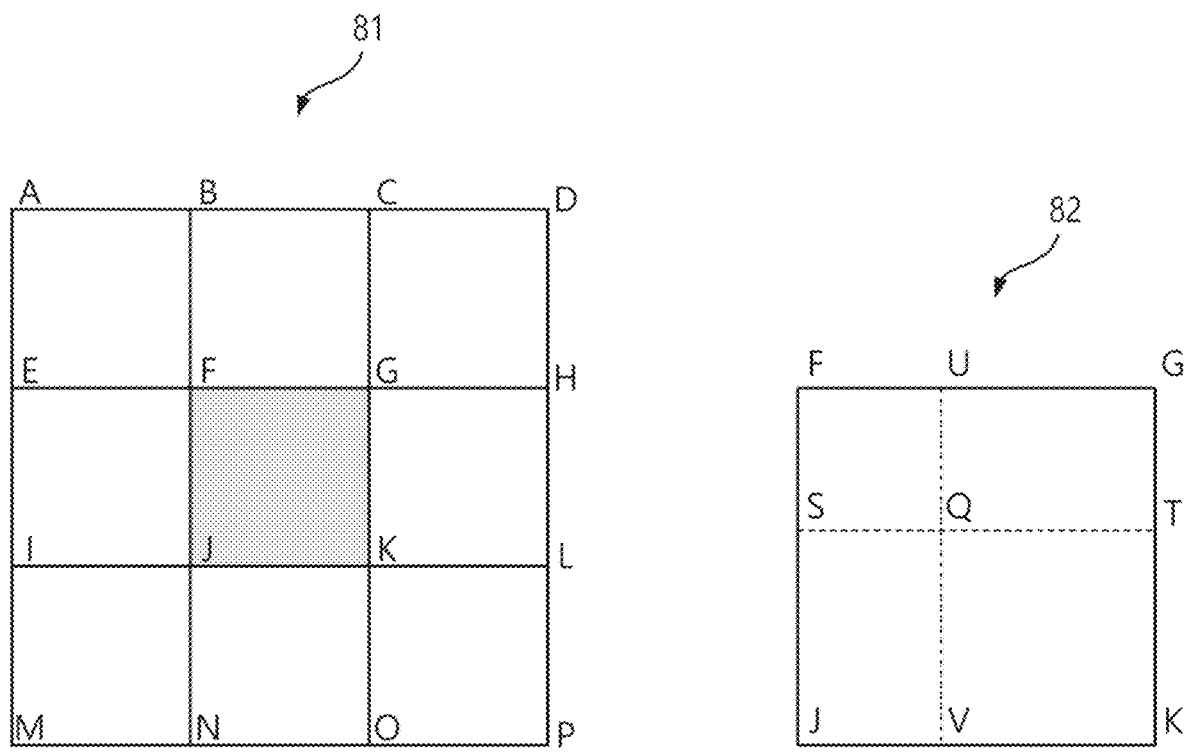
FIG. 8 is a diagram illustrating an operation of an interpolation circuit according to an example embodiment.

FIG. 8 is a diagram illustrating an operation of an interpolation circuit according to an example embodiment. In FIG. 8, reference number 81 indicates an image frame according to an example embodiment. Referring to FIG. 8, the image frame 81 may include four sub-images such as ACKI, BDLJ, EGOM, and FHPN. In this case, each of the plurality of sub-images may include four blocks. For example, the sub-image ACKI may include four blocks such as ABFE, BCGF, EFJI, and FGKJ, the sub-image BDLJ may include four blocks such as BCGF, CDHG, FGKJ, and GHLK, the sub-image EGOM may include four blocks such as EFJI, FGKJ, IJNM, and JKON, and the sub-image FHPN may include four blocks such as FGKJ, GHLK, JKON, and KLPO. From FIG. 8, it can be seen that at least one block of each of the plurality of sub-images overlaps another sub-image. For example, the block BCGF is included in the sub-image ACKI and the sub-image BDLJ. For example, the block FGJK is included in each of the four sub-images such as ACKI, BDLJ, EGOM, and FHPN.

The histogram calculation circuit 121 may calculate a histogram for each of the plurality of sub-images, apply a contrast limit to the histogram, and obtain a histogram tone curve for each sub-image through histogram equalization.

When an image frame is input, the interpolation circuit 123 may obtain histogram tone curves of a plurality of sub-images, constituting a previous image frame of a current input image frame, from the histogram calculation circuit 121 and may interpolate the obtained tone curves in units of blocks to perform tone mapping on the current input image frame.

For example, the interpolation circuit 123 may obtain a final histogram tone curve for a pixel included in a corresponding block using histogram tone curves of sub-images including a block to be interpolated and location information of pixels included in the block.

In FIG. 8, reference numeral 82 indicates a case in which interpolation is performed on a pixel Q included in the block FGKJ. In this case, the interpolation circuit 123 may obtain a final histogram tone curve for the pixel Q through an operation such as Equation 10 below.

$$HE_Q = \left(HE_{ACKI} \cdot \left(\frac{QT}{ST}\right) + HE_{BDLJ} \cdot \left(\frac{SQ}{ST}\right)\right) \cdot \frac{QV}{UV} + \quad \text{Equation 10}$$

$$\left(HE_{EGOM} \cdot \left(\frac{QT}{ST}\right) + HE_{FHPN} \cdot \left(\frac{SQ}{ST}\right)\right) \cdot \frac{UQ}{UV},$$

where $HE_Q$ represents the final histogram tone curve of the pixel Q, $HE_{ACKI}$ represents a histogram tone curve of the sub-image ACKI, $HE_{BDLJ}$ represents a histogram tone curve of the sub-image BDLJ, $HE_{EGOM}$ represents a histogram tone curve of the sub-image EGOM, $HE_{FHPN}$ represents a histogram tone curve of the sub-image FHPN, and QT/ST, SQ/ST, QV/UV, UQ/UV represent location information of the pixel Q within the FGKJ block.

In such a manner, the interpolation circuit 123 may obtain final histogram tone curves for all pixels included in the block FGKJ.

When there are two sub-images including a block such as the block BCGF, the block GHLK, the block JKON, or the block EFJI, the interpolation circuit 123 may interpolate the histogram tone curve of each sub-image in a single overlapping direction to obtain a final histogram tone curve for pixels included in the corresponding block. For example, the block BCGF is included in the two sub-images ACKI and BDLJ overlapping each other in a horizontal direction. In this case, the interpolation circuit 123 may interpolate a histogram tone curve of each sub-image in consideration of only a horizontal location of a pixel in the block BCGF. For example, the block GHLK is included in the two sub-images BDLJ and FHPN overlapping each other in the vertical direction. In this case, the interpolation circuit 123 may interpolate a histogram tone curve of each sub-image in consideration of only a vertical location of a pixel in the block GHLK.

In the case of a block which do not overlap another sub-image, such as the block ABFE, the block CDHG, the block KLPO, or the block IJNM, the interpolation circuit 123 may use a histogram tone curve of a sub-image including the corresponding block as it is, as a final histogram tone curve for the corresponding block.

Accordingly, the interpolation circuit 123 may apply pixel values of a current input image frame to the final histogram tone curves, obtained as described above, to perform tone mapping on the current input image frame.

Figure 9:
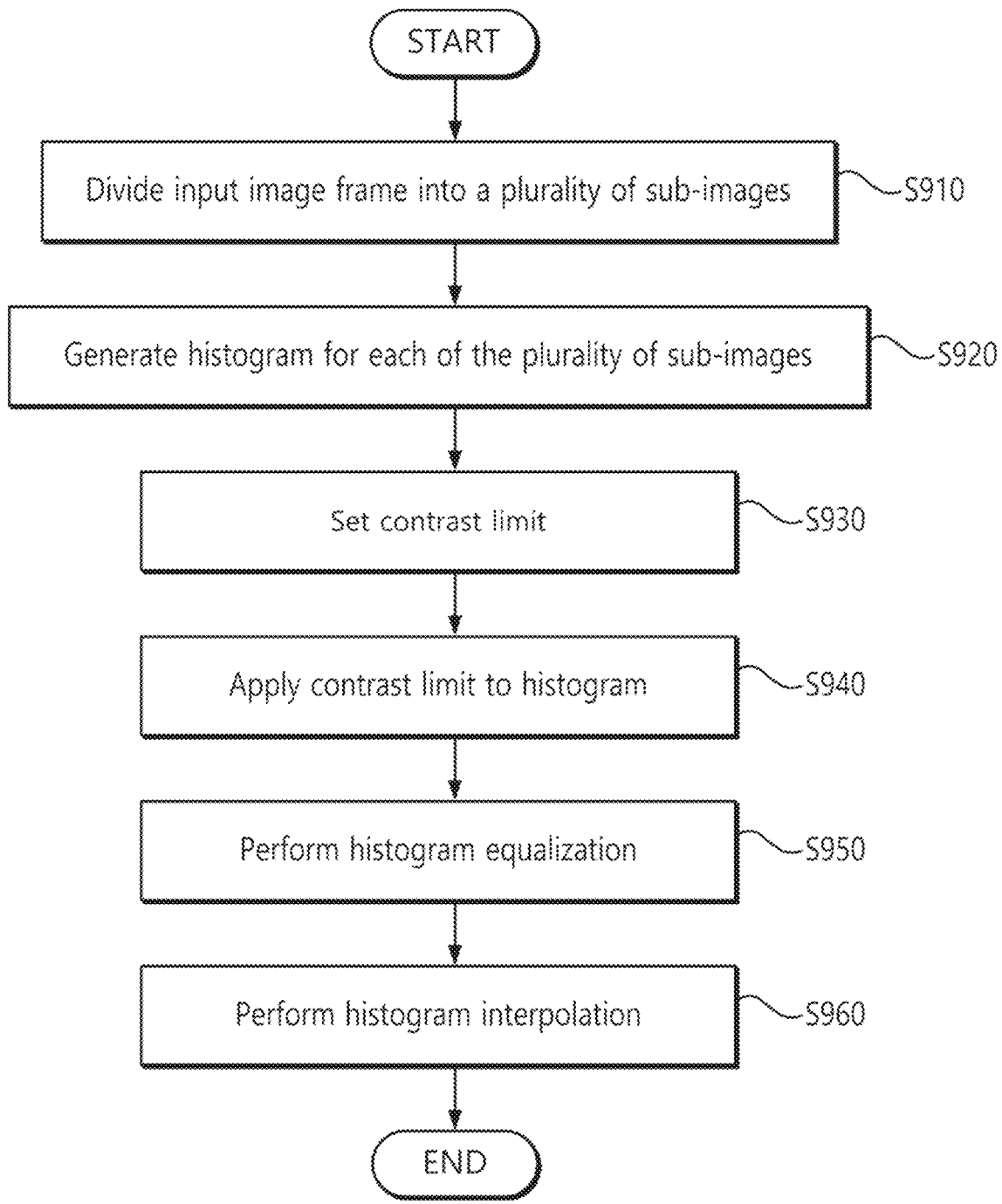
FIG. 9 is a flowchart illustrating an operation of a contrast enhancement circuit according to an example embodiment.

FIG. 9 is a flowchart illustrating an operation of a contrast enhancement circuit according to an example embodiment.

Referring to FIG. 9, in operation S910, the contrast enhancement circuit 120 may divide an input image frame into a plurality of sub-images. In operation S920, the contrast enhancement circuit 120 may generate a histogram for each of the plurality of sub-images. In operation S930, the contrast enhancement circuit 120 may set a contrast limit to be applied to the histogram. In operation S940, the contrast enhancement circuit 120 may apply the contrast limit to the histogram. In operation S950, the contrast enhancement circuit 120 may calculate a cumulative distribution function for the histogram to which the contrast limit is applied, and may normalize the calculated cumulative distribution function to perform histogram equalization. Accordingly, a histogram tone curve for each of the plurality of sub-images may be obtained.

In operation S960, the contrast enhancement circuit 120 may interpolate a histogram tone curves of a previous image frame in units of blocks to perform tone mapping on the current input image frame.

Figure 10:
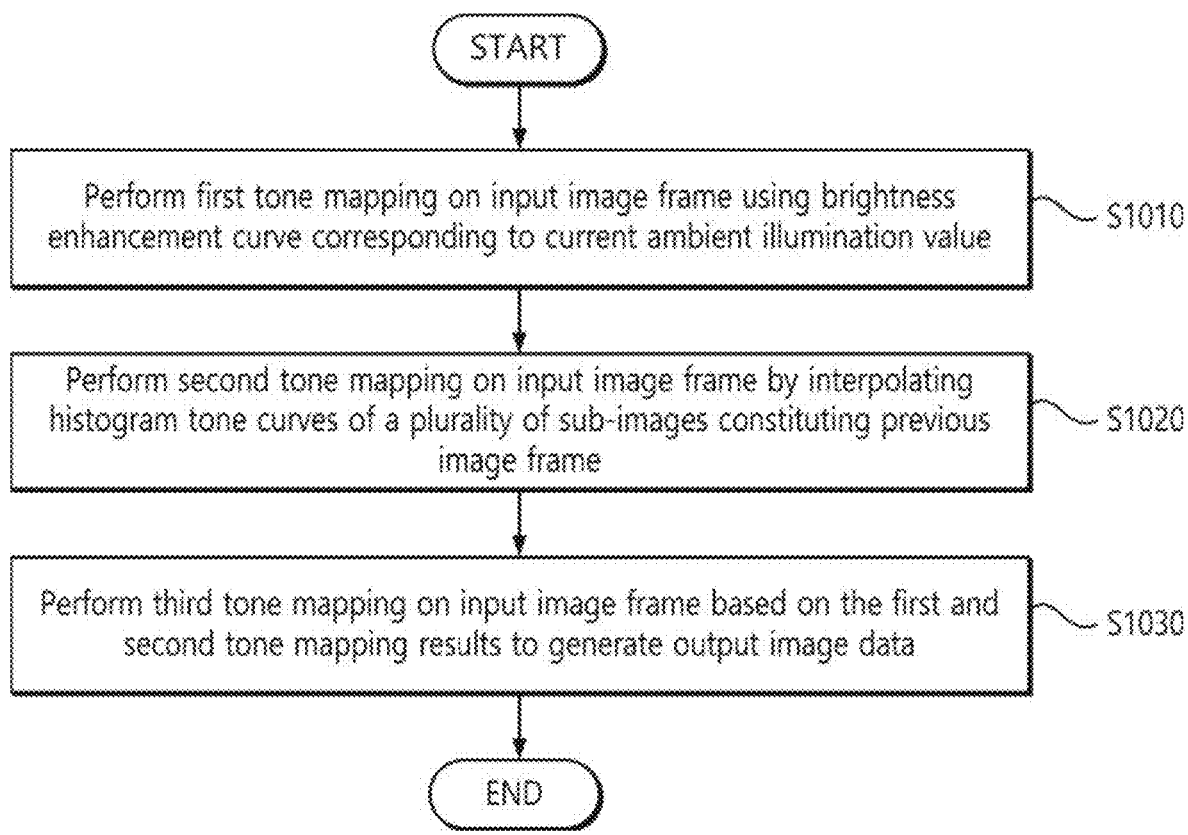
FIG. 10 is a flowchart illustrating an image processing method of an image processing device according to an example embodiment.

FIG. 10 is a flowchart illustrating an image processing method of an image processing device according to an example embodiment. Referring to FIG. 10, in operation S1010, the image processing device 100 may perform first tone mapping on an input image frame using a brightness enhancement tone curve corresponding to a current ambient illuminance value.

In this case, the brightness enhancement tone curve may be determined based on a first human vision system (HVS) response to a reference ambient illuminance value and a second HVS response to a target ambient illuminance value. According to an example embodiment, the first and second HVS responses may be calculated using a Naka-Rushton equation, and the brightness enhancement tone curve may define a relationship between an input pixel value and the first HVS response and an input pixel value of the second HVS response, to the same response value, within a luminance range of a display panel.

According to an example embodiment, the image processing device 100 may prestore a brightness enhancement tone curve corresponding to a single illuminance interval, among a plurality of ambient illuminance intervals. Accordingly, when a current ambient illuminance value is received, the image processing device 100 may apply a weight, assigned to an illuminance interval including a current ambient illuminance value, to the brightness enhancement tone curve and may perform the first tone mapping using the brightness enhancement tone curve to which the weight is applied. In this case, the prestored brightness enhancement tone curve may be calculated based on the first HVS response and the second HVS response to a representative value of the single illuminance interval.

In operation S1020, the image processing device 100 may apply a variable contrast limit to a histogram of each of a plurality of sub-images, constituting a previous image frame of the input image frame, to obtain histogram tone curves, and may interpolate the obtained histogram tone curves to perform the second tone mapping on the input image frame. In this case, each of the plurality of sub-images may include a plurality of blocks, and at least one of the plurality of blocks may overlap another sub-image.

According to an example embodiment, the image processing device 100 may perform histogram equalization on each of the plurality of sub-images. For example, the image processing device 100 may divide the input image frame into a plurality of sub-images and may generate a histogram for each of the plurality of sub-images.

Also, the image processing device 100 may set a contrast limit to be applied to the generated histogram. In this case, the image processing device 100 may set the contrast limit such that a contrast limit value for a relatively low pixel value is higher than a contrast limit value for a relatively high pixel value.

The image processing device 100 may apply the set contrast limit to the histogram of each of the plurality of sub-images, calculate a cumulative distribution function for the histogram to which the contrast limit is applied, and normalize the calculated cumulative distribution function to perform histogram equalization.

Accordingly, the image processing device 100 may interpolate histogram tone curves, obtained through the histogram equalization, in units of blocks to perform second tone mapping on the current input image frame. In this case, the histogram tone curves may be histogram tone curves for each of a plurality of sub-images of a previous image frame of the current input image frame.

Accordingly, in operation S1030, the image processing device 100 may perform third tone mapping on the input image frame to output output image data based on results of the first tone mapping and the second tone mapping.

Examples have been described, in which the bright enhancement circuit 110 and the contrast enhancement circuit 120 are connected and operate in parallel. However, example embodiments are not limited thereto, and the brightness enhancement circuit 110 and the contrast enhancement circuit 120 may be connected in series and sequentially perform tone mapping. Such an example embodiment is illustrated in FIG. 11.

Figure 11:
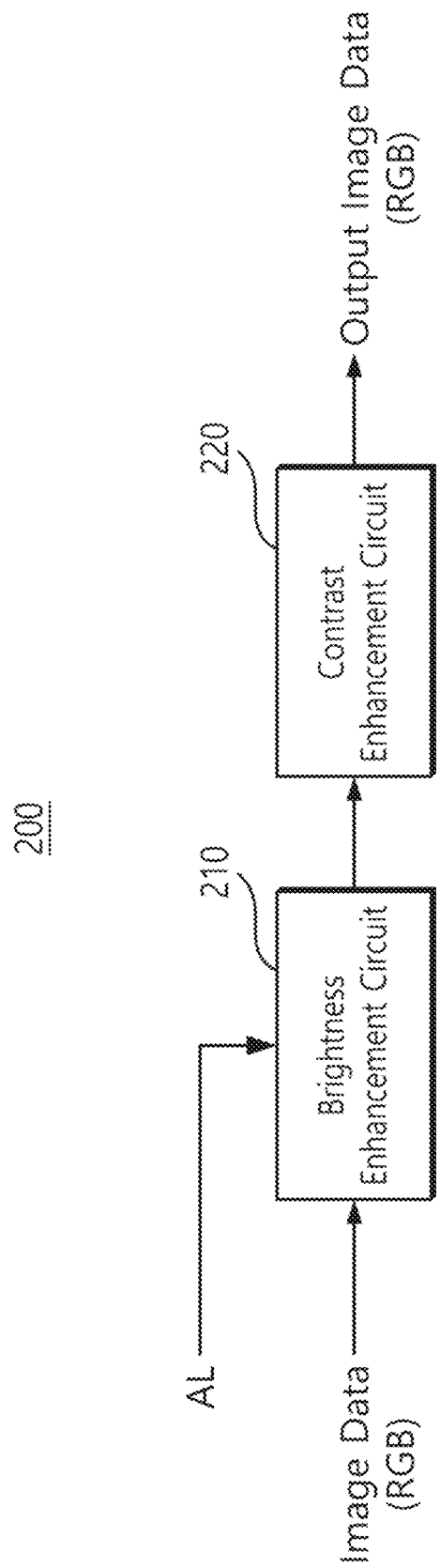
FIG. 11 is a block diagram of an image processing device according to an example embodiment.

Referring to FIG. 11, the image processing device 200 may include a brightness enhancement circuit 210 and a contrast enhancement circuit 220. The brightness enhancement circuit 210 and the contrast enhancement circuit 220 may be connected in series. In this regard, the image processing device 200 of FIG. 11 is different in configuration from the image processing device 100 of FIG. 2.

When a current illuminance value AL is received, the brightness enhancement circuit 210 may perform first tone mapping on an input image frame using a brightness tone curve corresponding to the received current illuminance value. For example, the brightness enhancement circuit 210 may perform the same operation as the above-described brightness enhancement circuits 110, 110A, 110B, and 110C. However, the brightness enhancement circuit 210 may include a converter, which may convert RGB image data into a V value, may perform tone mapping based on the V value, may convert the V value into RGB data and provide the RGB data to the contrast enhancement circuit 220.

The contrast enhancement circuit 220 may apply a variable contrast limit to a histogram of each of a plurality of sub-images, constituting a previous image frame of an input image frame, to obtain histogram tone curves, and may interpolate the histogram tone curves to perform second tone mapping on the input image frame. For example, the contrast enhancement circuit 220 may perform the same operation as the above-described contrast enhancement circuit 120.

The contrast enhancement circuit 220 may include a converter, configured to convert RGB image data into a V value, therein. Accordingly, when RGB data on which brightness enhancement tone mapping has been performed is received from the brightness enhancement circuit 210, the contrast enhancement circuit 220 may convert the received RGB data into a V value to perform the same operation as the above-described contrast enhancement circuit 120, convert a result of the operation into RGB data gain, and output the RGB data as output image data.

In this case, the contrast enhancement circuit 220 may output final output image data on which both brightness enhancement tone mapping and contrast enhancement tone mapping have been performed. Therefore, the contrast enhancement circuit 220 does not require an additional output interface, unlike the configuration of FIG. 2.

Figure 12:
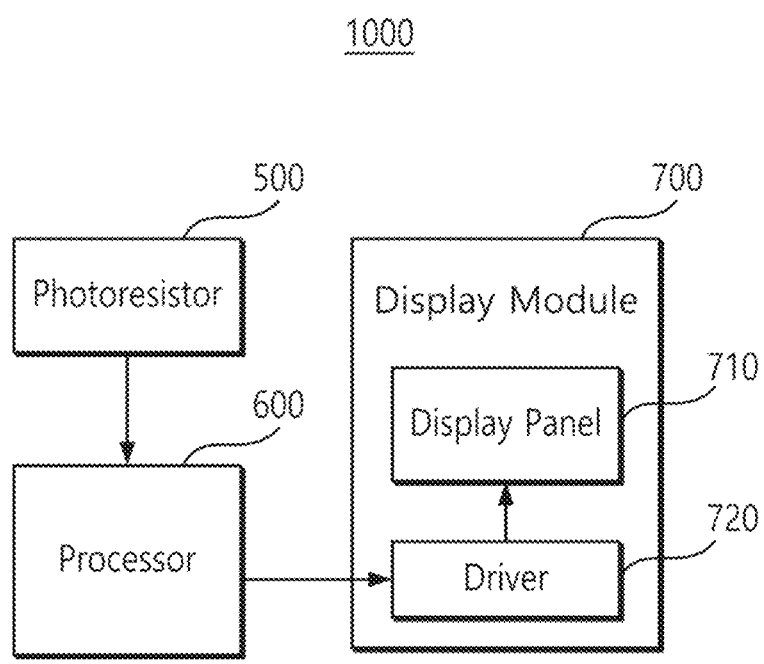
FIG. 12 is a block diagram of a display device according to an example embodiment.

FIG. 12 is a block diagram of a display device according to an example embodiment. Referring to FIG. 2, a display device 1000 may include an illuminance sensor 500, a processor 600, and a display module 700.

The illuminance sensor 500 may detect ambient brightness or an ambient illuminance value. The illuminance sensor 500 may also be referred to as a photoresistor, a photodetector, a cadmium sulfide (CDS), or the like, and a resistance value may vary depending on brightness of ambient light. The illuminance sensor 500 may transmit an electrical signal, corresponding to detected ambient light, to the processor 600.

The display module 700 may include a display panel 710, configured to display an image thereon, and a driver 720 configured to drive the display panel 710. In this case, the driver 720 may include at least one of a gate driver and a data driver. The display panel 710 may be implemented as a liquid crystal display (LCD) display panel including a backlight. Alternatively, the display panel 710 may be implemented as an organic light emitting diode (OLED) panel or a micro OLED panel including a spontaneous emission device.

The processor 600 may control the overall operation of the display device 1000. For example, the processor 600 may control the driver 720 through various control signals to display an image on the display panel 710.

The above-described image processing device 100 or 200 or respective intellectual properties (IPs) of the image processing device 100 or 200 may be implemented as a hardware IP, a software IP, or a combination thereof to be mounted on the driver 720. For example, a hardware IP may include circuitry to perform specific functions, and may have a design that includes a trade secret. Accordingly, the processor 600 and/or the driver 720, equipped with the image processing devices 100 or 200, may perform various operations of the above-described image processing device 100 or 200 using an ambient illuminance value detected by the illuminance sensor 500.

The display device 1000 including the image processing device 100 or 200 may be implemented as various electronic products. For example, the display device 1000 may be implemented as various products which can be used in environments with variable ambient light, such as outdoors. For example, the display device 1000 may be implemented as a mobile product such as a smartphone, a tablet computer, or a smartwatch. Alternatively, the display device 1000 may be implemented as a product such as a vehicle display, an outdoor billboard, a video wall, or a signage. However, example embodiments are not limited thereto.

According to an example embodiment, an image processing method of the image processing device 100 or 200 according to various example embodiments may be provided in a manner of being included in a computer program product. The computer program product may be traded between a seller and a purchaser as a commodity. The computer program product may be distributed in the form of a machine-readable storage medium (for example, a compact disc read only memory (CD-ROM)) or on-line via an application store (for example, Play Store™). In the case of on-line distribution, at least a part of the computer program product may be temporarily stored in or temporarily produced from a storage medium such as a manufacturer's server, a server of an application store, or a memory of a relay server.

According to the above-described various example embodiments, visibility of an image displayed on a display panel may be improved by enhancing brightness and contrast of the image. For example, visibility of an image may be improved in an outdoor environment having high ambient light intensity.

As set forth above, according to example embodiments, visibility of an image displayed on a display panel may be improved by enhancing both brightness of the image and contrast of the image.

In some embodiments, each of the components represented by a block as illustrated in FIGS. 1, 2, 5A, 6A, 6B, 7, 11 and 12 may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been shown and described above, it will be apparent to those skilled in the art that modifications and variations could be made without departing from the scope of the present inventive concept as defined by the appended claims.

What is claimed is:

1. An image processing device comprising:
    a processor configured to:
        perform first tone mapping on an input image frame using a brightness enhancement tone curve corresponding to a current ambient illuminance value to obtain a first result;
        obtain histogram tone curves by applying a variable contrast limit to a plurality of histograms respectively corresponding to a plurality of sub-images, constituting a previous image frame;
        perform second tone mapping on the input image frame by interpolating the histogram tone curves to obtain a second result; and
        provide output image data by performing third tone mapping on the input image frame based on the first result and the second result,
    wherein the brightness enhancement tone curve corresponds to a first human vision system (HVS) response to a reference ambient illuminance value and a second HVS response to a target ambient illuminance value.

2. The image processing device of claim 1, wherein the processor is further configured to:
provide a V value for red data, green data, and blue data of the input image frame; and
perform the first tone mapping and the second tone mapping on the input image frame using the V value.

3. The image processing device of claim 2, wherein the processor is further configured to:
mix the first result and the second result based on a user parameter to generate a final tone mapping curve based on the V value; and
apply the final tone mapping curve to each of the red data, the green data, and the blue data of the input image frame to generate the output image data.

4. The image processing device of claim 1, wherein the first HVS response and the second HVS response are calculated using a Naka-Rushton equation, and
wherein the brightness enhancement tone curve indicates a relationship between an input pixel value of the first HVS response and an input pixel value of the second HVS response, to a common response value, within a luminance range of a display panel.

5. The image processing device of claim 4, wherein the reference ambient illuminance value is an illuminance value preset as an ambient illuminance value.

6. The image processing device of claim 4, wherein the target ambient illuminance value comprises a representative illuminance value corresponding to the current ambient illuminance value, among a plurality of ambient illuminance intervals, and
wherein the processor is further configured to calculate the first HVS response and the second HVS response when the current ambient illuminance value is received, normalize the first HVS response and the second HVS response within the luminance range of the display panel, and define the relationship between the input pixel value of the first HVS response and the input pixel value of the second HVS response, to the common response value, to obtain the brightness enhancement tone curve.

7. The image processing device of claim 4, wherein the processor is further configured to preset a plurality of brightness enhancement tone curves, respectively corresponding to a plurality of ambient illuminance intervals, and perform the first tone mapping using a brightness tone curve corresponding to an illuminance interval comprising the current ambient illuminance value, among the plurality of ambient illuminance intervals, when the current ambient illuminance value is received, and
wherein each of the plurality of brightness enhancement tone curves is calculated based on the first HVS response, and the second HVS response to a representative illuminance value of a corresponding ambient illuminance interval.

8. The image processing device of claim 4, wherein the processor is further configured to prestore a brightness enhancement tone curve corresponding to a single illuminance interval, among a plurality of ambient illuminance intervals, apply a weight, associated with an illuminance interval comprising the current ambient illuminance value, to the prestored illuminance enhancement tone curve when the current ambient illuminance value is received, and perform the first tone mapping using the brightness enhancement tone curve to which the weight is applied, and wherein the prestored brightness enhancement tone curve is calculated based on the first HVS response, and the second HVS response to a representative illuminance value of the single illuminance interval.

9. The image processing device of claim 1, wherein each of the plurality of sub-images comprises a plurality of blocks, and at least two of the plurality of sub-images overlap each other.

10. The image processing device of claim 9, wherein the processor is further configured to:
perform histogram equalization on each of the plurality of sub-images; and
interpolate the histogram tone curves of the plurality of sub-images, obtained through the histogram equalization, in units of blocks to perform the second tone mapping on the input image frame.

11. The image processing device of claim 10, wherein the processor is further configured to divide the input image frame into the plurality of sub-images, generate the plurality of histograms, sets a contrast limit to be applied to the a first histogram of the plurality of histograms, apply the contrast limit to the first histogram, calculate a cumulative distribution function for the first histogram to which the contrast limit is applied, and normalize the cumulative distribution function to perform the histogram equalization.

12. The image processing device of claim 11, wherein the processor is further configured to set the contrast limit such that a first contrast limit value for a first pixel value is higher than a second contrast limit value for a second pixel value that is higher than the first pixel value.

13. An image processing method of an image processing device, the image processing method comprising:
performing first tone mapping on an input image frame using a brightness enhancement tone curve corresponding to a current ambient illuminance value to obtain a first result;
performing second tone mapping on the input image frame by applying a variable contrast limit to a plurality of histograms respectively corresponding to a plurality of sub-images, constituting a previous image frame, to obtain histogram tone curves;
interpolating the histogram tone curves to obtain a second result; and
performing third tone mapping on the input image frame based on the first result and the second result,
wherein the brightness enhancement tone curve corresponds to a first human vison system (HVS) response to a reference ambient illuminance value and a second HVS response to a target ambient illuminance value.

14. The image processing method of claim 13, wherein the first HVS response and the second HVS response are calculated using a Naka-Rushton equation, and
wherein the brightness enhancement tone curve indicates a relationship between an input pixel value of the first HVS response and an input pixel value of the second HVS response, to a common response value, within a luminance range of a display panel.

15. The image processing method of claim 14, wherein the image processing device prestores a brightness enhancement tone curve corresponding to a single illuminance interval, among a plurality of ambient illuminance intervals,
wherein the performing the first tone mapping comprises:
applying a weight, associated with an illuminance interval comprising the current ambient illuminance value, to the prestored brightness enhancement tone curve when the current ambient illuminance value is received; and performing the first tone mapping using the brightness enhancement tone curve to which the weight is applied, and wherein the prestored brightness enhancement tone curve is calculated based on the first HVS response, and the second HVS response to a representative illuminance value of the single illuminance interval.

16. The image processing method of claim 13, wherein each of the plurality of sub-images comprises a plurality of blocks, and at least one of the plurality of blocks overlaps two of the plurality of sub-images.

17. The image processing method of claim 16, wherein the performing the second tone mapping comprises:
performing histogram equalization on each of the plurality of sub-images; and
interpolating histogram tone curves of the plurality of sub-images, obtained thorough the histogram equalization, in units of blocks.

18. The image processing method of claim 17, wherein the performing the histogram equalization comprises:
dividing the input image frame into the plurality of sub-images;
generating the plurality of histograms;
setting a contrast limit to be applied to a first histogram of the plurality of histograms;
applying the contrast limit to the first histogram; and
performing histogram equalization by calculating a cumulative distribution function for the first histogram, to which the contrast limit is applied, and normalizing the cumulative distribution function.

19. The image processing method of claim 18, further comprising setting the contrast limit such that a first contrast limit value for a first pixel value is higher than a second contrast limit value for a second pixel value that is higher than the first pixel value.

20. A display device comprising:
a display panel;
an illuminance sensor configured to detect an ambient illuminance value; and
an image processing device comprising a processor configured to:
perform first tone mapping on an input image frame using a brightness enhancement tone curve corresponding to a current ambient illuminance value detected by the illuminance sensor to obtain a first result;
obtain histogram tone curves by applying a variable contrast limit to a plurality of histograms respectively corresponding to a plurality of sub-images, constituting a previous image frame;
perform second tone mapping on the input image frame by interpolating the histogram tone curves to obtain a second result; and
provide output image data by performing third tone mapping on the input image frame based on the first result and the second result,
wherein the brightness enhancement tone curve corresponds to a first human vision system (HVS) response to a reference ambient illuminance value and a second HVS response to a target ambient illuminance value.

* * * * *